(12) United States Patent
Duven

(10) Patent No.: US 6,958,951 B2
(45) Date of Patent: Oct. 25, 2005

(54) ADAPTIVE KALMAN FILTER PROCESS FOR CONTROLLING AN ENSEMBLE CLOCK

(75) Inventor: Dennis J. Duven, Silver Spring, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/898,418

(22) Filed: Jul. 23, 2004

(65) Prior Publication Data

US 2005/0024157 A1 Feb. 3, 2005

Related U.S. Application Data

(60) Provisional application No. 60/489,396, filed on Jul. 23, 2003, and provisional application No. 60/488,894, filed on Jul. 21, 2003.

(51) Int. Cl.[7] .................. G04B 47/00; G04C 11/00; G04F 5/00; H03L 7/00; G06F 15/00
(52) U.S. Cl. .................. 368/10; 368/46; 368/156; 331/2; 331/25; 331/46; 702/176; 702/190; 702/196
(58) Field of Search .................. 368/10, 46, 47, 368/52, 155–157, 200–202; 331/1, 2, 25, 46, 49; 375/376; 702/176, 189, 190, 196

(56) References Cited

U.S. PATENT DOCUMENTS

| 4,322,831 A | 3/1982 | Petersen |
| 4,582,434 A | 4/1986 | Plangger |
| 4,607,257 A | 8/1986 | Noguchi |
| 4,899,117 A | 2/1990 | Vig |
| 4,921,467 A | 5/1990 | Lax |
| 5,041,798 A | 8/1991 | Moorman |
| 5,128,909 A | 7/1992 | Stein |
| 5,155,695 A | 10/1992 | Stein |
| 5,276,661 A | 1/1994 | Beg |
| 5,315,566 A | 5/1994 | Stein |
| 5,325,074 A | 6/1994 | Suenaga |
| 5,357,491 A | 10/1994 | Yamasaki |
| 5,440,313 A | 8/1995 | Osterdock |
| 5,461,652 A | 10/1995 | Hongo |
| 5,615,177 A | 3/1997 | Yahata |
| 5,666,330 A | 9/1997 | Zampetti |
| 5,697,082 A * | 12/1997 | Greer et al. ............. 455/255 |
| 5,706,256 A | 1/1998 | Hood, Jr. et al. |
| 5,719,827 A | 2/1998 | Diep et al. |
| 5,751,777 A | 5/1998 | Zampetti |
| 5,812,497 A | 9/1998 | Yahata |
| 5,881,022 A | 3/1999 | Morganstein |
| 5,943,381 A * | 8/1999 | Zampetti ................. 375/376 |
| 6,055,362 A | 4/2000 | Kesner |
| 6,288,977 B1 | 9/2001 | Yoshida |
| 6,573,799 B1 * | 6/2003 | Akopian ................... 331/64 |
| 6,651,031 B2 * | 11/2003 | Akopian .................. 702/178 |
| 2002/0018402 A1 | 2/2002 | Egle et al. |

OTHER PUBLICATIONS

Mills, David L. "Improved Algorithms for Synchronizing Computer Network Clocks," 1994, Electrical Engineering Department, University of Delaware, pp. 1–11.

(Continued)

Primary Examiner—Vit W. Miska
(74) Attorney, Agent, or Firm—Albert J. Fasulo, II

(57) ABSTRACT

In an ensemble oscillator system including multiple free-running oscillators, a voltage controlled oscillator having a frequency responsive to a control signal, and a differencer unit that measures time differences between the oscillators, an adaptive Kalman Filter Processor (AKFP) generates the control signal responsive to the time differences. The AKFP uses oscillator noise models to model noise/errors of the ensemble system oscillators, including random noise parameters, and adaptively estimates the errors and the random noise parameters to derive the control signal.

10 Claims, 6 Drawing Sheets

OTHER PUBLICATIONS

M.D. Shuster, D.W. Porter, and B.P. Gibbs: "Maximum Likelihood Estimation Techniques for Trident Missile System Parameters," Prepared for the Johns Hopkins University Applied Physics Laboratory by Business and Technological Systems, Inc. report No. BTS10–82–64/rb1037, Sep. 1983.

P.S. Maybeck: "Stochastic Models, Estimation, and Control," vol. 2, Chapter 10, Academic Press, Inc., New York, 1982.

G.F. Franklin, J.D. Powell, and M. Workman: "Digital Control of Dynamic Systems," 3rd Ed., pg. 286, Addison Wesley Longman, Inc., Menlo Park, CA, 1998.

* cited by examiner

Figure 5  Structure and processing flow of the AKF processor.

ADAPTIVE KALMAN FILTER PROCESS FOR CONTROLLING AN ENSEMBLE CLOCK

CROSS REFERENCE TO RELATED APPLICATIONS

This application claims priority to U.S. Provisional Application No. 60/489,396, filed Jul. 23, 2003, and is related to U.S. Provisional Application No. 60/488,894, filed Jul. 21, 2003, each of which is incorporated herein in its entirety by reference.

This application is also related to U.S. Non-provisional application Ser. No. 10/898,417, filed Jul. 23, 2004, entitled "Ensemble Oscillator and Related Methods," by Duven et al., which is incorporated herein in its entirety by reference.

STATEMENT OF GOVERNMENTAL INTEREST

This invention was made with Government support under Navy Contract Nos. N00039-01-C-2233 and N00039-02-C-2217 awarded by Space and Naval Warfare Systems Command. The Government has certain rights in the invention.

BACKGROUND OF THE INVENTION

1. Field of the Invention

The present invention relates generally to multiple oscillator systems.

2. Description of the Related Art

Conventional systems, such as satellite systems, disadvantageously use complex and expensive atomic oscillators, such as rubidium or cesium oscillators, to provide precise and stable reference frequencies. In such systems, there is a need to provide reference frequencies approaching the accuracies available from atomic standards, without using the atomic standards.

SUMMARY OF THE INVENTION

An embodiment of the present invention includes a method of controlling an ensemble oscillator system. The system is configured to generate: a reference frequency; multiple free-running frequencies; a controlled frequency having a frequency responsive to a control signal; and difference measurements indicative of time and frequency-based errors associated with each free-running frequency and the controlled frequency relative to the reference frequency. The method generates the control signal responsive to the difference measurements, and comprises: (a) using dynamic relationships associated with each free-running frequency and the controlled frequency to represent time and frequency-based errors corresponding to variances and covariances having magnitudes and rates of growth determined by random process weighting (RPW) parameters; and (b) the following adaptive Kalman filtering steps that, when executed in a steady-state condition, use the difference measurements to produce their respective results: (i) adaptively estimating the RPW parameters associated with each free-running frequency; (ii) generating, using the RPW parameter estimates from step (i), variances and covariances associated with each free-running frequency; (iii) generating, using the variances and covariances from step (ii), error weights associated with each free-running frequency; (iv) estimating weighted time and frequency-based errors associated with each free-running frequency, wherein the weighted error estimates are weighted with the corresponding error weights from step (iii); and (v) estimating, based on the weighted error estimates from step (iv), time and frequency-based errors associated with the controlled frequency.

Further apparatus and method embodiments of the present invention will be apparent from the ensuing description.

BRIEF DESCRIPTION OF THE DRAWINGS

Various embodiments are described below with reference to the drawings

DETAILED DESCRIPTION OF THE PREFERRED EMBODIMENT(S)

Overview

Figure 1:
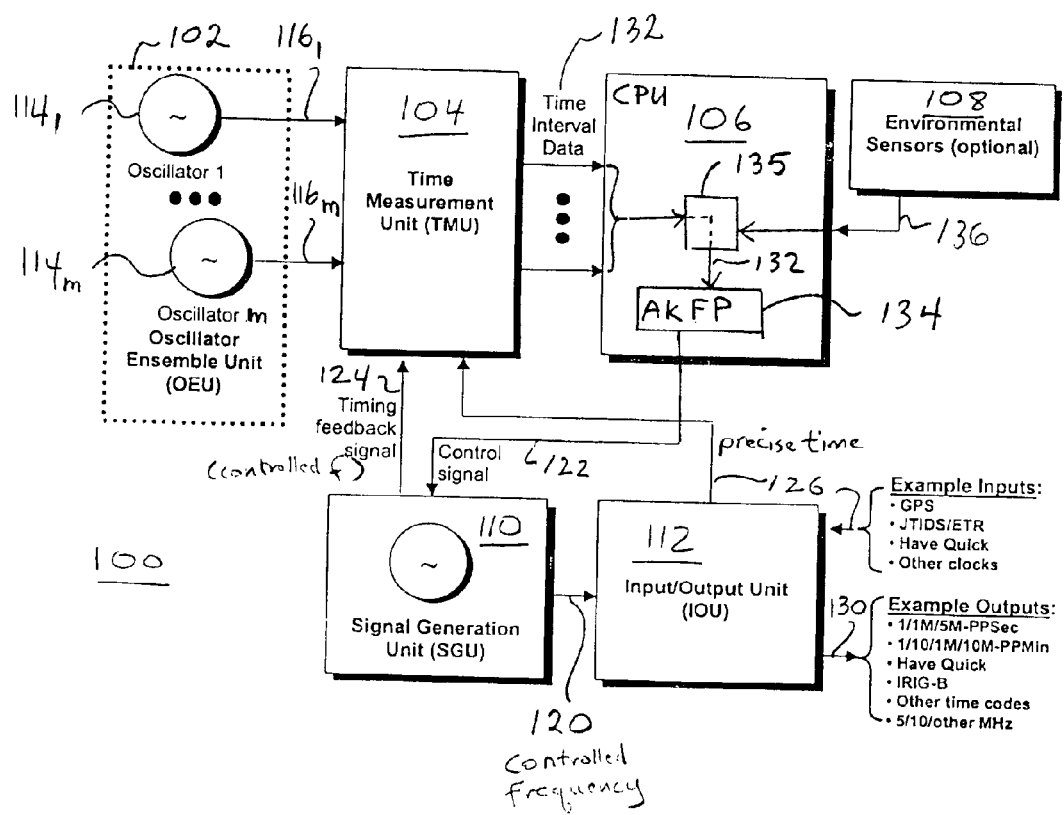
FIG. 1 is a block diagram of an example ensemble oscillator system constructed and operated in accordance with the principles of the present invention.

FIG. 1 is a block diagram of an example ensemble oscillator system 100, including an oscillator ensemble unit (OEU) 102, a time measurement unit (TMU) 104, a central processor unit (CPU) or controller 106, optional environmental sensors 108, a signal generation unit (SGU) or output oscillator 110 (also referred to as a frequency controlled oscillator), and an input/output unit (IOU) 112.

OEU 102 includes multiple (m) ensemble frequency sources or oscillators $114_1$–$114_m$ that generate corresponding ensemble free-running frequency signals $116_1$–$116_m$ (also referred to as frequencies $116_1$...$116_m$). The ensemble oscillators 114 generate frequencies 116 concurrently. Each ensemble oscillator is a stand-alone or free-running oscillator in that system 100 does not control the phase and frequency of the free-running oscillator. OEU 102 provides ensemble free-running frequency signals 116 to respective inputs of TMU 104.

Oscillators 114 can include any type or a mix of types of oscillators, including quartz oscillators, temperature-compensated quartz oscillators, ovenized quartz oscillators, micro-mechanical oscillators, atomic clocks, and so on. Oscillators 114 may be co-located with one another and with the other modules of ensemble oscillator system 100. Alternatively, one or more of oscillators 114 may be located at a remote location with respect to the other oscillators and connected to OEU 102 by either wired or wireless links, and/or a telecommunication network.

Each of free-running frequency signals 116 may be represented as any type of waveform, such as a sine wave, a square wave, a trapezoid or triangle wave, or a pulsed waveform, for example. In an embodiment, each of frequency signals 116 is at approximately the same frequency as the other frequency signals, such as at or near 10 MHz. In another embodiment, the frequencies of frequency signals 116 are substantially different from one another.

SGU 110 generates a controlled frequency signal 120 (also referred to as a controlled frequency 120 or an output signal 120) having a frequency and a phase responsive to a control signal 122, and provides the controlled frequency signal to IOU 112. In an embodiment, the frequency of controlled frequency signal 120 is approximately matched to the frequencies of ensemble frequency signals 116. SGU 110 also generates a feedback signal 124 and provides the feedback signal to an input of TMU 104. Like controlled frequency signal 120, the frequency and phase of feedback signal 124 are responsive to control signal 122. In an embodiment, feedback signal 124 and controlled frequency signal 120 are the same signal. Thus, feedback signal is also referred to herein as controlled frequency signal 124 or controlled frequency signal 124.

IOU 112 receives a master time reference signal 126 (also referred to as a precise time signal 126 or a reference signal 126) from an external source (not shown), in addition to controlled frequency signal 120. Examples of such precise time include GPS time, including, for example, a GPS derived 1PPS signal, a JTIDS/ETR signal, and a Have Quick signal. IOU 112 passes precise time signal 126 to TMU 104. From controlled frequency signal 120 and precise time signal 126, IOU 112 produces a plurality of output signals 130. IOU 112 includes logic to produce output signals 130 such as 1/1M/5M PPS signals (where M=$10^6$), 1/10/1M/10M PPMinute signals, Have Quick, IRIG-B or other time codes, and 5 MHz/10 MHz/other clocks, etc.

TMU 104 (also referred to as differencer unit 104) measures differences, such as time differences or intervals, for example, between controlled frequency signal 124 and each of (i) time reference signal 126, and (ii) ensemble frequency signals 116, and passes the measured time differences as signals 132 to controller 106. Measured differences (or difference measurements) 132 are indicative of frequency and phase differences between controlled frequency signal 124 and each of (i) time reference signal 126, and (ii) ensemble signals 116. Specifically, measured differences 132 indicate time and frequency-based errors associated with each of (i) controlled frequency 124, and (ii) each or free-running frequencies 116, relative to reference signal 126.

CPU 106 controls ensemble oscillator system 100. CPU 106 includes an Adaptive Kalman Filter Processor (AKFP) 134 (also referred to as an AKFprocessor 134). AKFP 134 processes time interval date 132 to produce control signal 122 for controlling the phase and/or frequency of controlled frequency signal 120 and feedback signal 124. CPU 106 and AKFP are computer based controllers including memory, input/output modules and ports, software or computer program modules, and any other digital and/or analog logic as is know in the art to support all of the functionality required of CPU 106 and AKFP 134 described herein.

CPU 106 also includes an optional sensor module 135 configured to operate as described below.

Environmental sensors 108 include one or more vibration sensors for sensing a level of vibration associated with one or more corresponding oscillators 114. Environmental sensors 108 may also include a temperature sensor for sensing the temperature of oscillators 114. Environmental sensors 108 provide sensed data 136, including vibration levels and temperature, to sensor module 135 of CPU 106. Sensor module 136 passes difference measurements 132 from differencer unit 104 to AKFP 134 only when the sensed vibration levels indicated in signal 136 are below a predetermined level.

TMU

Figure 2:
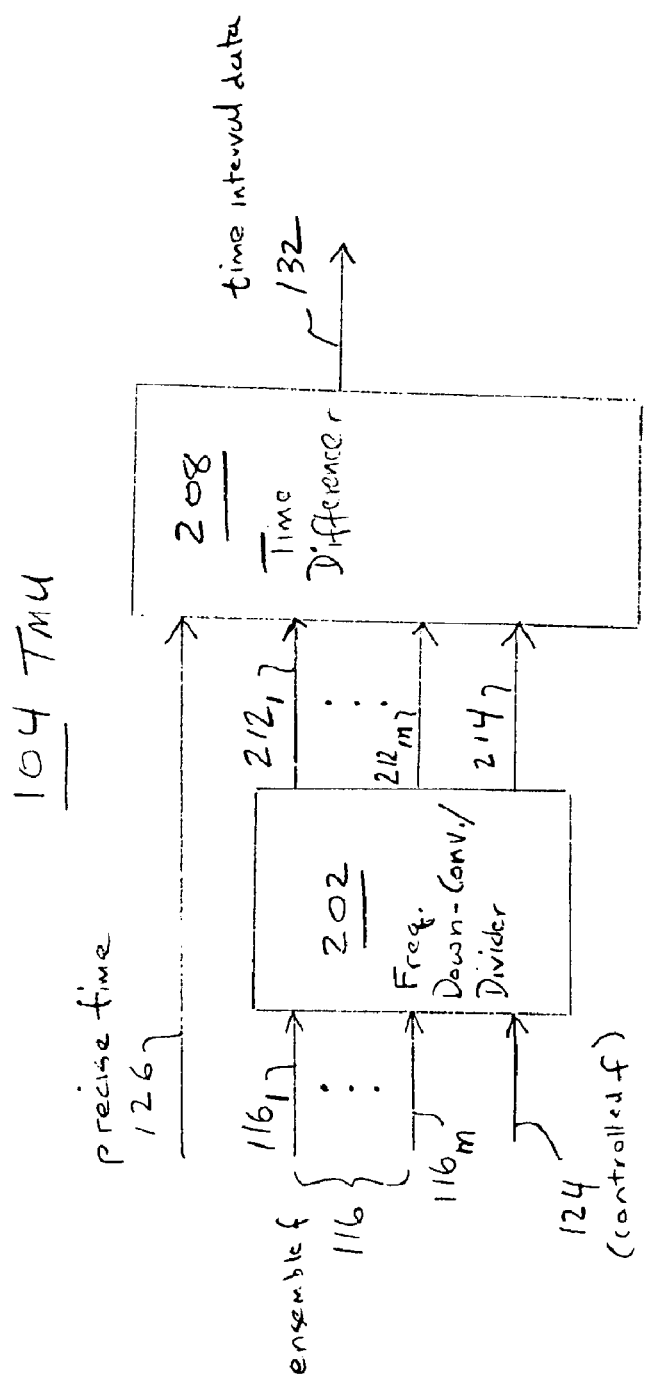
FIG. 2 is a block diagram of an example arrangement of a Time Measurement Unit (TMU) of the system of FIG. 1

FIG. 2 is a block diagram of an example arrangement of TMU 104. TMU 104 includes a frequency down-converter module 202 and a differencer 208 following module 202. Module 202 frequency down-converts ensemble frequency signals $116_1$–$116_m$ to corresponding lower-frequency ensemble signals or ensemble free-running time signals 212a–212n (also referred to as free-running times 212), such as periodic pulsed signals. Also, module 202 frequency down-converts controlled frequency signal 124 to a lower-frequency controlled time signal 214 (also referred to as a controlled time 214), such as a periodic pulsed signal. In and embodiment, module 202 includes dividers to divide the frequency f of each ensemble frequency signal 116i, and controlled frequency signal 124, to a lower-frequency f/N. In an example, frequency f is 10 MHz and N is $10^7$. Time signals 212 and 214 may each be a 1PPS signal.

Differencer 208 measures time differences between controlled time signal 214 and (i) each of ensemble time signals 212, and (ii) precise time signal 126, to produce time difference signals 132. TMU 104 provides time difference signals 132 to AKFP 134 in the form of a vector including the time differences 132.

SGU

Figure 3:
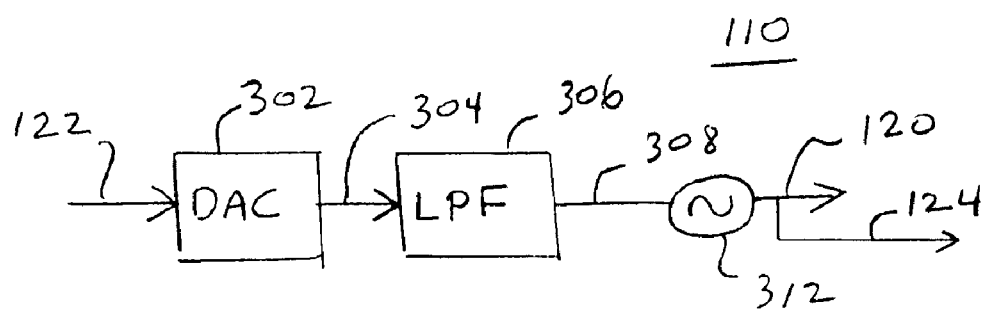
FIG. 3 is a block diagram of an example arrangement of a Signal Generation Unit (SGU) of the system of FIG. 1.

FIG. 3 is a block diagram of an example arrangement of SGU 110. SGU 110 includes a digital-to-analog-converter (DAC) 302 to convert control signal 122 from a digital format into an analog signal 304. A low pass filter (LPF) 306 filters signal 304, to produce a signal 308. A voltage controlled oscillator (VCO) 312 generates controlled frequency signal 120, having its frequency and phase controlled responsive to control signal 308.

Adaptive Kalman Filter Processor (AKFP)

As is known in the art, a frequency source or oscillator generates a frequency having a frequency error y(t) (or "y"). The frequency error tends to wander or drift randomly at a rate. This error is referred to as frequency drift or rate error d(t) (or "d"). The oscillator frequency may be divided-down to produce a time signal. The time signal has a time error x(t) (or "x"). An oscillator error model or set of dynamic relationships, i.e., equations, may be used to quantify the aforementioned oscillator time, frequency and frequency drift errors. In the present invention, AKFP 134 uses or assumes such oscillator error models or dynamic relationships of oscillators in system 100 to transform time interval data 132 into control signal 122.

Figure 4:
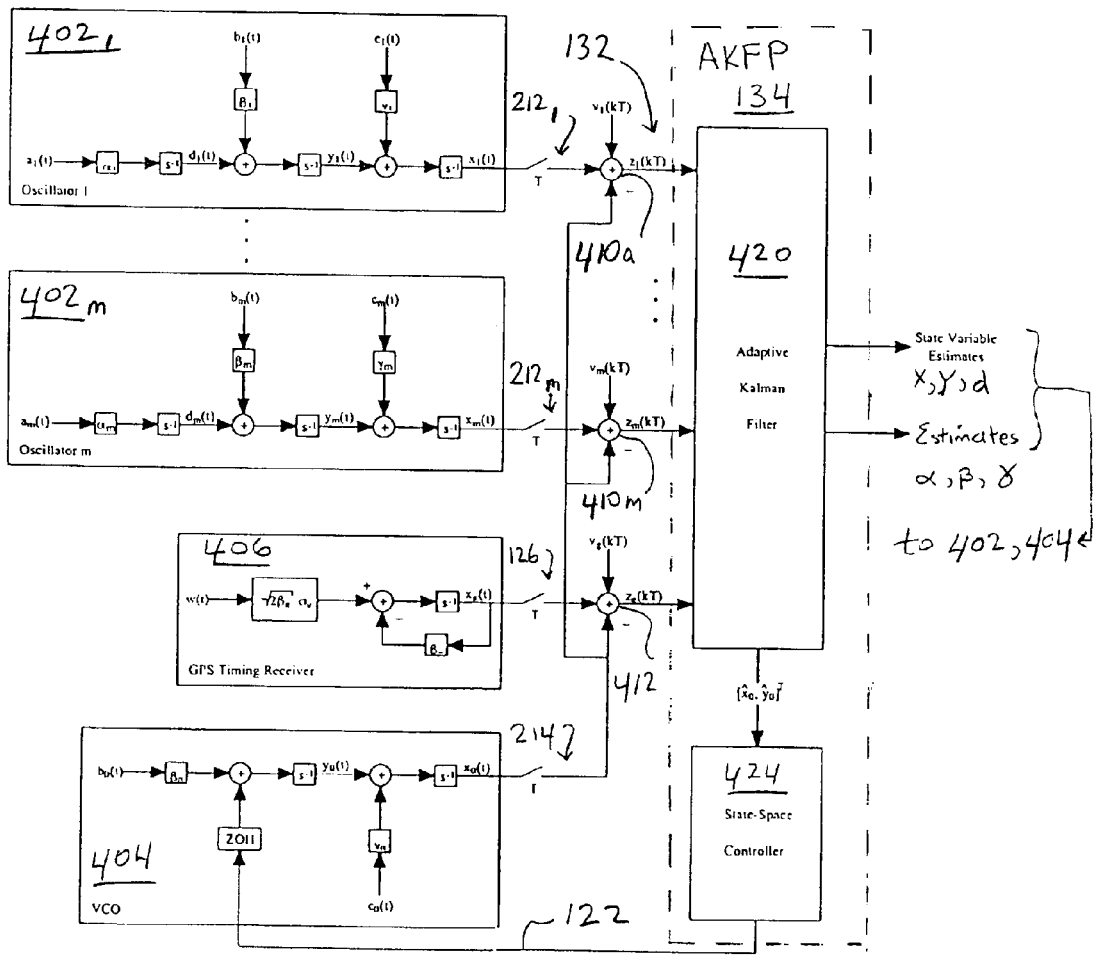
FIG. 4 is a block diagram of an example Adaptive Kalman Filter Processor (AKFP) of the system of FIG. 1 and oscillator error models used by the AKFP.

FIG. 4 is a block diagram of an embodiment of AKFP 134 and a set of oscillator error models 402, 404 and 406 corresponding respectively to oscillators or frequency sources 114, 110 (312) and 112 of 100, used by the AKFP. Ensemble oscillator error models $402_1$–$402_m$ represent errors associated with ensemble oscillators $114_1$–$114_m$. Specifically, oscillator error models $402_1$–$402_m$, respectively represent or characterize time errors $x_1 \ldots x_m$ (or $x_1 \ldots m$) of respective time signals $221_1 \ldots 212_m$, frequency errors $y_1 \ldots y_m$ of respective ensemble signals $116_1 \ldots 116_m$, and frequency drift errors $d_1 \ldots d_m$ associated with respective frequency errors $y_1 \ldots y_m$.

Oscillator error model 404 represents errors associated with VCO 312. Specifically, oscillator error model 404 represents time error $x_0$ of time signal 214, frequency error $y_0$ of signal 124, and frequency drift error $d_0$ associated with frequency error $y_0$.

IOU 112 is modeled as a reference time source that generates a reference frequency, from which is derived precise time signal 126. The reference time source is represented as oscillator error model 406. Oscillator error model 406 represents time error $x_g$ of time signal 126.

Models 402 and 404 include unit random noise inputs a, b and c weighted with respective weighting parameters alpha "α," beta "β," and gamma "γ," to derive the time, frequency and frequency drift errors of the respective oscillators. In the embodiment depicted in FIG. 4:

(i) the frequency errors $y_{0, 1 \ldots m}$ are represented as first and second integrals of the product of weighting parameters $beta_{0, 1 \ldots m}$ and $alpha_{1 \ldots m}$ (also referred to herein as random process weighting (RPW) parameters) with unit variance whit e noise random processes, and (ii) the time errors $x_{0, 1 \ldots m}$ are represented as first integrals of the sum of the fractional frequency errors and the product of weighting parameters $gamma_{0, 1 \ldots m}$ with additional unit variance white noise random processes.

Thus, generally, the time, frequency, and frequency drift errors are functions of both the corresponding alpha α, beta β, and gamma γ parameters, and the noise processes. The alpha and beta parameters determine the magnitudes and rates of growth of the variances and covariances of the time, frequency and frequency rate errors.

As mentioned above, TMU 104 generates time differences (i.e., signals 132) between time signal 214 and (i) each of time signals 212, and (ii) time signal 126. Accordingly, also depicted in FIG. 4 are subtractive adders 410 and 412, fed by the respective outputs of error oscillator models 402–406, that model the time differencing action of TMU 104 (i.e., differencer 208) with respect to time errors associated with the oscillators. Adders 410, 412 yield time difference errors z (specifically, errors $z_1 \ldots z_m$ and $z_g$) as functions of time errors x and error perturbation signals v. These errors are associated with time interval data 132.

AKFprocessor 134 receives time interval 132. AKFprocessor 134 uses time interval 132 together with the oscillator error models or dynamic relationships depicted in FIG. 4 to:

(a) compute running estimates of the time, frequency, and frequency drift errors of each of ensemble oscillators 114 and VCO 312 relative to the reference time scale or external time reference provided, e.g., by a GPS timing receiver;

(b) control VCO 312 such that its time and frequency errors are maintained close to zero relative to the reference time scale; and (c) adaptively estimate the alpha and beta parameters corresponding to each of the ensemble oscillators 114 and VCO 312.

AKFprocessor 134 uses the estimates of the time x, frequency y, and frequency drift d errors of each of ensemble oscillators 114 and VCO 312 as state variables in a Kalman filter process. AKFprocessor 134 also uses the alpha and beta parameters in the Kalman filter process. The estimated errors and alpha and beta parameters are used to update the oscillator error models.

The significance of the alpha and beta parameters is that they determine the rate of error growth in the time and frequency errors of each oscillator. Adaptive estimation of these parameters in the present invention permits the VCO control aspect of AKFprocessor 134 to select weighting parameters such that ensemble oscillators having relatively lower noise (that is, lower time, frequency and frequency drift errors) exert more influence on the frequency control of VCO 312 than do ensemble oscillators associated with relatively higher noise. Also, maintaining time, frequency, and frequency drift estimates on ensemble oscillators 114 during periods of precise time signal (e.g., GPS) availability allows AKFprocessor 134 to maintain tighter control on VCO error growth during precise time signal (e.g., GPS) outages than is possible when there is only one free-running oscillator.

As depicted in FIG. 4, AKFprocessor 134 includes an adaptive Kalman filter 420 that 420 receives time interval measurements 132 and produces (i) state variable estimates x, y and z, and (ii) estimates of the alpha, beta and gamma parameters. AKFprocessor 134 also includes a State Space Controller (SSC) 424 that produces control signal 122 based on the state variable estimates from Kalman filter 420.

Figure 5:
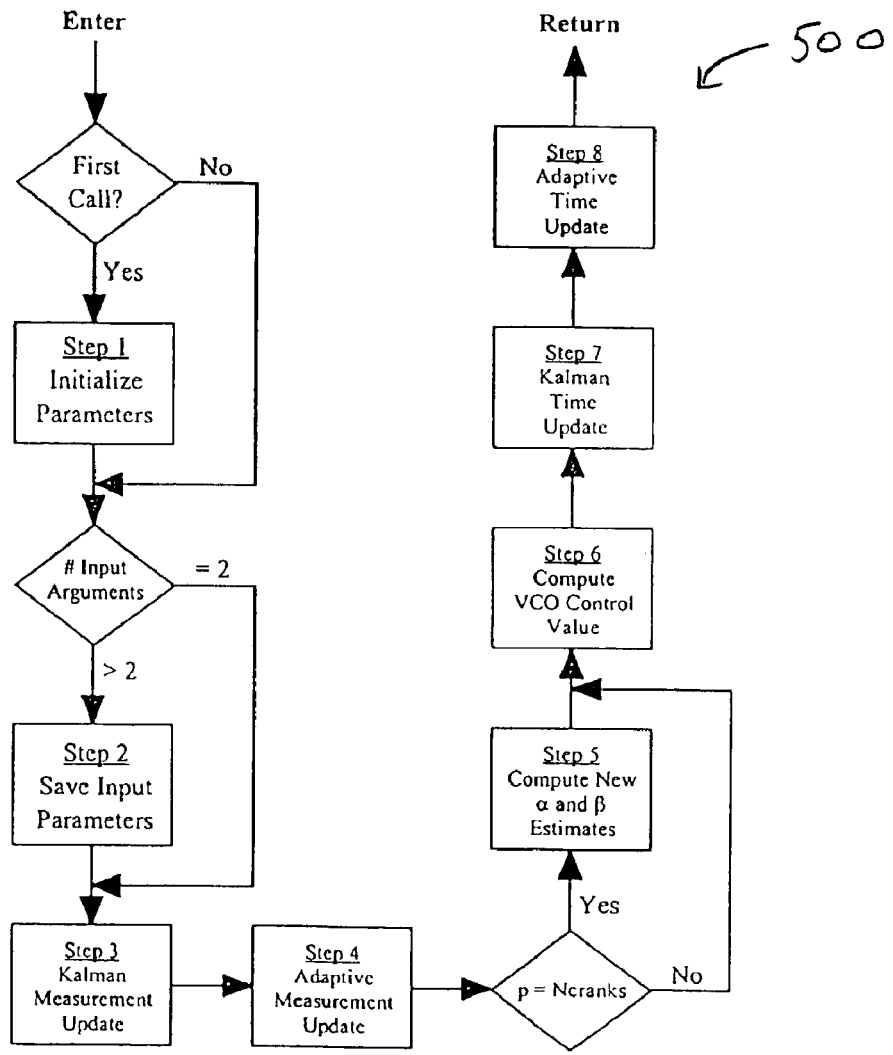
FIG. 5 is a flow chart of an example method executed by the AKFP.

FIG. 5 is a flow chart of an example method 500 executed by AKFprocessor 134. Method 500 includes eight (8) main method steps, described below. Process flow proceeds from Step 1 to Step 8 as depicted in FIG. 5. Adaptive Kalman filter 420 executes Steps 1–5, 7 and 8 of method 500, while SSC executes Step 6. Steps 1–8 depicted in FIG. 5 represents both method steps and software modules of AKFP 134.

Listed first below are the overall inputs to and outputs from AKFprocessor 134 and method 500. Then, a description of each of the Steps 1–8 of method 500 ensues. In the embodiment described below, AKFprocessor 134 operates on time, fractional frequency, and fractional frequency rate errors. "Fractional frequency error" is equal to frequency error divided by the nominal center frequency of a given frequency signal, and "fractional frequency rate error" is equal to frequency rate error divided by the nominal center frequency. Frequency error, fractional frequency error, frequency rate error and fractional frequency rate error are generally referred to herein collectively and individually as frequency-based error(s).

| Inputs | |
|---|---|
| Z | (m + 1)-dimensional vector of time difference measurements corresponding to time interval measurements 132 $[x_1 - x_0, \ldots, x_m - x_0, x_g - x_0]^T$ |
| SigmaV | (m + 1)-dimensional vector of measurement error σ's |
| Tcompute | Number of seconds needed to compute the VCO control values |
| Tcrank | Number of seconds between input measurement sets to the Kalman filter |
| Ncranks | Number of input measurement sets between re-evaluations of the α, β estimates |
| kValues | (m + 1,3)-dimensional matrix of initial α, β, γ values for the m free-running oscillators and the VCO |
| kMin | (m + 1,2)-dimensional matrix of minimum allowable values for the α, β estimates |
| kMax | (m + 1,2)-dimensional matrix of maximum allowable values for the α, β estimates |

| Outputs | |
|---|---|
| FracFreqRate | Digital values to be used by the SGU to generate a VCO control voltage/signal that drives the VCO time and frequency errors to zero |
| kEstimate | Current value of the estimated α and β parameters |
| Out2 | Current value of the a posteriori estimates of the time, frequency, and frequency drift errors of the VCO and m free-running oscillators |
| Out3 | Square-root of the diagonal of the a posteriori covariance matrix |

Step 1—Initialize Parameters.

Purpose: When the AKFprocessor 134 receives control for the first time, in step numerous parameters and matrices needed by the algorithm, i.e., method 500, are initialized to appropriate values. The parameters initialized and their significance are as follows:

| | |
|---|---|
| Uk | Current VCO fractional frequency rate control |
| ControlPoles | Location in the z-plane of the VCO controller's poles |
| m | Number of free-running oscillators |
| n | Number of state variables to be estimated |
| Xm | Current a priori estimates of the state variables (estimates of x, y and d before incorporating |

-continued

| | current measurements) |
|---|---|
| Xp | Current a posteriori estimates of the state variables (estimates of x, y and d after incorporating current measurements) |
| Pm | Current a priori covariance matrix |
| Pp | Current a posteriori covariance matrix |
| Hmatrix | Measurement matrix |
| dXmdTh | Partials of Xm with respect to $\alpha^2$ and $\beta^2$ |
| dXpdTh | Partials of Xp with respect to $\alpha^2$ and $\beta^2$ |
| dPmdTh | Partials of Pm with respect to $\alpha^2$ and $\beta^2$ |
| dPpdTh | Partials of Pp with respect to $\alpha^2$ and $\beta^2$ |
| dJdTh | Partials of J with respect to $\alpha^2$ and $\beta^2$ |
| Twait | Tcrank - Tcompute |
| PhiVCO | VCO transition matrix with $\Delta t$ = Tcrank |
| GammaVCO | VCO input matrix with $\Delta t$ = Tcrank |
| PhiCompute | VCO transition matrix with $\Delta t$ = Tcompute |
| GammaCompute | VCO input matrix with $\Delta t$ = Tcompute |
| PhiWait | VCO transition matrix with $\Delta t$ = Twait |
| GammaWait | VCO input matrix with $\Delta t$ = Twait |
| PhiMatrix | Transition matrix for all n states, $\Delta t$ = Tcrank |

Inputs: None.
Outputs: The parameters listed above.
  Step 2—Save Input Parameters.
  Purpose: Since parameters Tcompute, Tcrank, Ncranks, kValues, kMin, and kMax are usually constant over many calls to the AKFprocessor 134, these values are saved in persistent memory when supplied, and the saved values are used when the input parameters are not supplied. In addition, a few parameters that are derived from the input parameters are also computed and saved in persistent memory.
Inputs: Tcompute, Tcrank, Ncranks, kValues, kMin, kMax, m
Outputs: Tc=Saved value of Tcompute
  dT=Saved value of Tcrank
  Nc=Saved value of Ncranks
  Theta=$[\beta_1^2, \ldots, \beta_{(m+1)}^2, \alpha_1^2, \ldots, \alpha_m^2]^T$
  Finv=diag(Theta$^2$)
  dF=(2m+1,2m+1)matrix of 0's
  FinvDiv=[(m+1)1's, (m)10's]
  ThMin=kMin$^2$
  ThMax=kMax$^2$
  Step3—Kalman Measurement Update.
  Purpose: Adaptive processing starts with a standard Kalman Measurement Update as described by the equations shown below. This results in an optimal estimate of the state vector up to and including the current set of measurements. It also provides the matrices needed in Steps 4 and 5 for adaptive estimation of the $\alpha$ and $\beta$ parameters.
    I=Vector of indexes for which SigmaV$_i$>0
    H=I$^{th}$ rows of Hmatrix
    Rmatrix=diag(SigmaV$_i^2$)
    B=H*Pm*H$^T$+Rmatrix
    Binv=B$^{-1}$
    Kmatrix=Pm*H$^T$*B$^{-1}$
    ImKH=I−Kmatrix*H
    Nu=Z$_i$−H*Xm
    Xp=Xm+Kmatrix*Nu
    Pp=ImKH*Pm
Inputs: SigmaV, Hmatrix, Pm, Xm, Theta
Outputs: H=Measurement matrix for the measurements being used
  Binv=Inverse of the innovations covariance matrix
  ImKH=a priori to a posteriori gain matrix
  Nu=Current measurement residuals (innovations)
  Xp=a posteriori state variable estimates
  Pp=a posteriori covariance matrix
  kEstimate=Current $\alpha$ and $\beta$ estimates (optional AKFprocessor 134 output)
  Out2=Current Xp estimates (optional AKFprocessor 134 output)
  Out3=sqrt(diag(Pp))=Current state uncertainty levels (optional output)

Step 4—Adaptive Measurement Update.
Purpose: Together, Steps 4 and 5 adaptively estimate the $\alpha$ and $\beta$ parameters. These parameters determine the rate of growth of a clock/oscillator's time and frequency uncertainty. In a given class of oscillator (e.g., ovenized crystal oscillators) these parameters can vary by factors of 2–10, and between different classes of oscillators (e.g., crystal vs. atomic oscillators) these parameters can vary by several orders of magnitude. In an ordinary (non-adaptive) Kalman filter, these parameters are typically specified by a human operator/analyst. This is frequently done by a separate (i.e., side) analysis of time sequences of clock/oscillators that are similar to those being processed, and usually requires an iterative trial-and-error process in which the performance of the Kalman filter with a certain set of parameter values is observed and then modified until acceptable performance is achieved. The AKFprocessor 134 of the present invention uses the principles of advanced statistical estimation theory to estimate the parameter values from data provided by the actual oscillators being processed, including the ensemble of free-running oscillators 114. The general principles for adaptive Kalman filter processing are given in References [1], [2] and [3], each of which is incorporated herein by reference in its entirety. Step 4 computes matrices that are used in Step 5 to estimate the $\alpha$ and $\beta$ parameter estimates. The equations used in Step 4 to compute the matrices are as follows:

$$dNudTh(i) = -H * dXmdTh(i)$$

$$dBdTh(i) = H * dPmdTh(i) * H^T$$

$$dKdTh(i) = ImKH * dPmdTh(i) * H^T * Binv$$

$$dXpdTh(i) = ImKH * dXmdTh(i) + dKdTh(i) * Nu$$

$$dPpdTh(i) = ImKH * dPmdTh(i) * ImKH^T$$

$$dJdTh(i) = dJdTh(i) + Nu^T * Binv * dNudTh(i) -$$
$$0.5 * Nu^T * Binv * dBdTh(i) * Binv * Nu +$$
$$0.5 * \text{Trace}[Binv * dBdTh(i)]$$

$$dF(I, j) = dF(I, j) + dNudTh^T(i) * Binv * dNudTh(j) +$$
$$\text{trace}[0.5 * Binv * dBdTh(i) * Binv * dBdTh(j)]$$

where: $I = (0, \ldots, 2m)$ and $j = (0, \ldots, 2m)$

Inputs: H, dXmdTh, dPmdTh, ImKH, Binv, Nu, dJdTh, dF
Outputs: dJdTh=Partials of J with respect to $\alpha^2$ and $\beta^2$, where J is a conditional information matrix that represents a measurement of the quality of the alpha and beta estimates. That is, J represents how close to reality the alpha and beta estimates are. Therefore, J is a quantity to be minimized, e.g., when estimates of alpha and beta are correct, J is zero.
  dF=Information added to the Fisher information matrix over the current Ncranks accumulation interval Step 5—Compute New α and β Estimates.

Purpose: New Maximum Likelihood (ML) estimates of $\alpha^2$ and $\beta^2$ are computed in this step on a schedule of one new set of estimates per Ncranks calls to the AKFprocessor 134. The equations used to calculate these estimates are as follows:

$$\text{diag}(Finv) = (1 + 1/FinvDiv) * \text{diag}(Finv)$$

$$Finv = \text{inv}[\text{inv}(Finv) + dF]$$

$$\text{Theta} = \max\{ThMin, \min[ThMax, \text{Theta} - Finv * dJdTh)]\}$$

dXmdTh=0 dPmdTh=0
dXpdTh=0 dPpdTh=0
dJdTh=0 dF=0
p=0

Inputs: Finv, FinvDiv, dF, dJdTh, Theta, ThMin, and ThMax

Outputs: Theta=(2m+1)-dimensional vector of $\alpha^2$ and $\beta^2$ estimates
- dXmdTh=Partials of Xm with respect to $\alpha^2$ and $\beta^2$
- dXpdTh=Partials of Xp with respect to $\alpha^2$ and $\beta^2$
- dPmdTh=Partials of Pm with respect to $\alpha^2$ and $\beta^2$
- dPpdTh=Partials of Pp with respect to $\alpha^2$ and $\beta^2$
- dJdTh=Partials of J with respect to $\alpha^2$ and $\beta^2$
- dF=Partial sum of Fisher information matrices
- p=Crank counter (number of AKFprocessor 134 calls since last step-5 update)

Step 6—Compute VCO Control Value.

Purpose: This component of the AKFprocessor 134 uses estimates of the current time and fractional frequency error of the VCO/clock 312 produced by the adaptive Kalman filter to compute what the rate of change of fractional frequency error ($Uk = dy_{VCO}/dt$) must be so that both the time and fractional frequency errors of the VCO/clock are quickly driven to zero. These control values are converted into a time-varying control voltage V(t) in the Signal Generation Unit (SGU) and are applied as input to the VCO to achieve the desired time and frequency control for this oscillator. The control values are calculated by the equation $$Uk = -Kcontrol * xyVCO,$$

where xyVCO is a 2-element column vector containing the predicted time and fractional frequency error of the VCO/clock at time ($t_k$+tCompute), where $t_k$ represents current time and tCompute represents the amount of time needed by the CPU computer to process the measurements taken at time $t_k$. xyVCO is calculated from the a posteriori state estimate $Xp(t_k)$ produced by the adaptive Kalman filter according to the equation $$xyVCO = PhiCompute * Xp(1:2) + GammaCompute * Uk.$$

Kcontrol is a 2-element row vector of control gains produced by the Ackerman design procedure described in Ref. [3]:
Kcontrol=$n^{th}$ row of $P = C^{-1}\alpha_c(\Phi)$ where
$C = [\Gamma, \Phi\Gamma, \ldots, \Phi^{n-1}\Gamma]$
$\alpha_c(z)$=Desired characteristic polynomial for VCO control
$\Phi$=VCO transition matrix (PhiVCO) and
$\Gamma$=VCO control input matrix (GammaVCO).

Inputs: PhiVCO, GammaVCO, ControlPoles, PhiCompute, GammaCompute, Xp, Uk

Outputs: xyVCO=Estimated VCO time/frequency error at time ($t_k$+tCompute)
Uk=VCO fractional frequency rate control value
FracFreqRate=Uk Step 7—Kalman Time Update.

Purpose: This step produces the expected a priori state vector (Xm) and associated covariance matrix (Pm) for the next measurement time, $t_{k+1} = t_k + T$crank. The equations used for computing these quantities are as follows:

$$Xm(1:2) = PhiWait * xyVCO + GammaWait * Uk$$

$$Xm(3:n) = PhiMatrix(3:n, 3:n) * Xp(3:n)$$

$$q_{11}(i) = \hat{\gamma}_i^2 * dT + (1/3)\hat{\beta}_i^2 * dT^3 + (1/20)\hat{\alpha}_i^2 * dT^5$$

$$q_{12}(i) = (1/2)\hat{\beta}_i^2 * dT^2 + (1/8)\hat{\alpha}_i^2 * dT^4$$

$$q_{13}(i) = (1/6)\hat{\alpha}_i^2 * dT^3$$

$$q_{22}(i) = \hat{\beta}_i^2 * dT + (1/3)\hat{\alpha}_i^2 * dT^3$$

$$q_{23}(i) = (1/2)\hat{\alpha}_i^2 * dT^2$$

$$q_{33}(i) = \hat{\alpha}_i^2 * dT$$

$Qmatrix = \text{diag}(Q_0, Q_1, \ldots, Q_m)$, where $$Q_0 = \begin{bmatrix} q_{22}(0) & q_{23}(0) \\ q_{23}(0) & q_{33}(0) \end{bmatrix} \text{ and } Q_i = \begin{bmatrix} q_{11}(i) & q_{12}(i) & q_{13}(i) \\ q_{12}(i) & q_{22}(i) & q_{23}(i) \\ q_{13}(i) & q_{23}(i) & q_{33}(i) \end{bmatrix}$$

$$Pm = PhiMatrix * Pp * PhiMatrix^T + Qmatrix$$

Inputs: PhiWait, GammaWait, xyVCO, Uk, PhiMatrix, Theta, dT, Xp, Pp

Outputs: Xm=a priori state vector estimate for next measurement time
Pm=a priori covariance matrix for next measurement time Step 8—Adaptive Time Update.

Purpose: Calculations needed to complete the adaptive estimation of the α and β parameters are executed in this step. In this case the partials of Xm and Pm at the next measurement time, $t_{k+1} = t_k + t$Crank, are computed from the partials dXpdTh and dPpdTh generated in Step 4 for time $t_k$. The equations to be used for these calculations are as follows:

(a) $dXmdTh = PhiMatrix * dXpdTh$ (b) $dPmdTh(i) = PhiMatrix * dPpdTh(i) * PhiMatrix^T$ $$dPmdTh_{j,j}(i) = dPmdTh_{j,j}(i) + \begin{bmatrix} (1/3)dT^3 & (1/2)dT^2 \\ (1/2)dT^2 & dT \end{bmatrix}$$

(where $i = 0$ and $j = [1, 2]$)

(c) $dPmdTh(i) = PhiMatrix * dPpdTh(i) * PhiMatrix^T$ $$dPmdTh_{j,j}(i) = dPmdTh_{j,j}(i) + \begin{bmatrix} (1/3)dT^3 & (1/2)dT^2 \\ (1/2)dT^2 & dT \end{bmatrix}$$

(where $i = [1:m]$ and $j = [3i, 3i+1]$)

(d) $dPmdTh(i) = PhiMatrix * dPmdTh(i) * PhiMatrix^T$ $$dPmdTh_{j,j}(i) = dPmdTh_{j,j}(i) + \begin{bmatrix} (1/20)dT^5 & (1/8)dT^4 & (1/6)dT^3 \\ (1/8)dT^4 & (1/3)dT^3 & (1/2)dT^2 \\ (1/6)dT^3 & (1/2)dT^2 & dT \end{bmatrix}$$

-continued (where $i = [m + 1:2m]$ and $j = [3i, 3i + 1]$).

Inputs: PhiMatrix, dXpdTh, dPpdTh, and dT.
    Outputs: dXmdTh=Partials of $Xm(t_{k+1})$ with respect to $\alpha^2$ and $\beta^2$
    dPmdTh=Partials of $Pm(t_{k+1})$ with respect to $\alpha^2$ and $\beta^2$.

Figure 6:
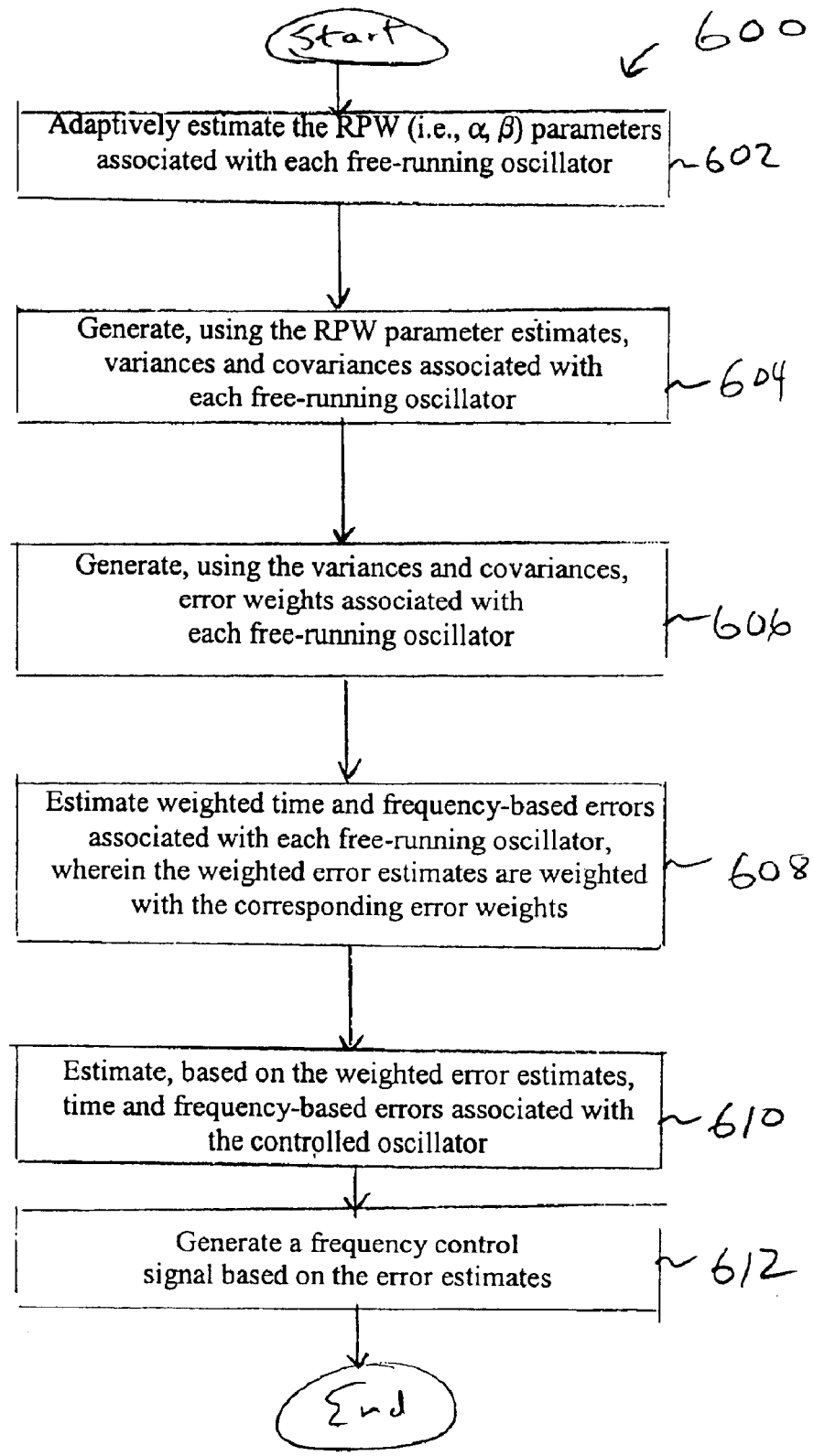
FIG. 6 is a is a flow chart of another example summary method executed by the AKFP.

FIG. 6 is a flow chart of an example method 600 summarizing the flow and some of the important features of Steps 1–8 from method 500. Entering method 600 it is assumed that AKFP 134 has already passed through initializing Steps 1 and 2, and is now operating in a steady-state condition wherein 100 continuously passes difference measurements 132 to AKFP 134, and AKFP 134 has already been cyclically generating various inputs to and outputs from the Steps 1–8.

It is also assumed that AKFP 134 uses the dynamic relationships depicted in FIG. 4 to represent time errors and frequency-based errors (e.g., fractional frequency and fractional frequency rate errors) associated with oscillators 114 and 110. The errors are relative to the reference signal 126. The alpha and beta parameters mentioned above are random process weighting (RPW) parameters that determine the magnitudes and rates of growth of the variances and covariances of the time and frequency-based errors.

A first step 602 of method 600 includes adaptively and optimally estimating the RPW parameters (i.e., the alpha and beta parameters) associated with each free-running frequency (e.g., of free-running frequency signals 116). These RPW estimates effectively indicate relative noise levels associated with each free-running oscillator or its free-running frequency.

A next step 604 includes generating, using the RPW parameter (i.e., alpha and beta) estimates from step 602, variances and covariances associated with each free-running frequency.

A next step 606 includes generating, using the variances and covariances from step 604, error weights associated with each free-running frequency.

A next step 608 includes optimally estimating weighted time and frequency-based errors associated with each free-running frequency, wherein the weighted error estimates are weighted with the corresponding error weights from step 606.

Steps 604, 606 and 608 collectively represent a step of deriving, based on the RPW parameters from the first module, weighted time and frequency-based error estimates associated with each free-running frequency, wherein the weighted errors estimates are weighted to favor less noisy free-running frequencies over more noisy free-running frequencies.

A next step 610 includes optimally estimating, based on the weighted error estimates from step 608, time and frequency-based errors associated with the controlled frequency (e.g., of controlled frequency signal 124). Steps 602–610 can be performed by adaptive Kalman filter 420.

A next step 612 includes generating a frequency control signal (e.g., frequency control signal 122) based on the error estimates from step 610. State Space Controller 424 can perform step 612. In steps 604–612, lower noise oscillators are used more heavily than higher noise oscillators in generating the frequency controlled signal. Specifically, the weighted error estimates from step 608 favor the lower noise oscillators, as indicated by the RPW parameters.

Conclusion

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

References

[1] M. D. Shuster, D. W. Porter, and B. D. Gibbs: "Maximum Likelihood Estimation Techniques for Trident Missile System Parameters", Business and Technological Systems, Inc. report number BTS 10-82-64/rb 1037, September 1983.

[2] P. S. Maybeck: "Stochastic Models, Estimation, and Control", vol. 2, Academic Press, New York, 1982.

[3] G. F. Franklin, J. D. Powell, and M. Workman: "Digital Control of Dynamic Systems", 3rd Ed., Addison-Wesley, Menlo Park, Calif. 1998.

What is claimed is:

1. In a system configured to generate:

a reference time signal;

m free-running frequencies having corresponding fractional frequency errors $y_{1 \ldots m}$ and fractional frequency rate errors $d_{1 \ldots m}$, from which are derived m corresponding free-running times having corresponding time errors $x_{1 \ldots m}$;

a controlled frequency responsive to a responsive to a control signal Uk, the controlled frequency having a fractional frequency error $y_0$, from which is derived a controlled time having time error $x_0$; and a difference measurement vector representing time differences between the controlled time and
    each of the free-running times, and
    the reference time;

wherein:
    the fractional frequency errors are represented as functions of weighting parameters $alpha_{1 \ldots m}$ and $beta_{0, 1 \ldots m}$; and
    the time errors are represented as functions of the fractional frequency errors, a method of adaptively estimating the $alpha_{1 \ldots m}$ and $beta_{0, 1 \ldots m}$ parameters, comprising:

(a) initializing
    a system state vector including a priori estimates of the time, fractional frequency, and fractional frequency rate errors,
    a corresponding covariance matrix of estimation errors, the $alpha_{1 \ldots m}$ and $beta_{0, 1 \ldots m}$ parameters, and
    a corresponding set of partial derivative matrices;

(b) performing a Kalman Measurement Update based on the time difference measurement vector, to produce current time a posteriori state vector estimates of the time errors $x_{0, 1 \ldots m}$, the fractional frequency errors $y_{0, 1 \ldots m}$, and the fractional frequency rate errors $d_{1 \ldots m}$, and
    a current time a posteriori covariance matrix;

(c) updating the partial derivative matrices relative to the current time difference measurement vector; and (d) updating, based on the updated partial derivative matrices, the $alpha_{1 \ldots m}$ and $beta_{0, 1 \ldots m}$ parameters.

2. The method of claim 1, further comprising:

(e) computing, based on the current time estimates from step (b) of the time error $x_0$ and the fractional frequency error $y_0$ associated with the controlled frequency, the control signal Uk that causes the time and fractional frequency errors of the controlled frequency to be driven toward, and maintained over time near, zero with respect to the reference time.

3. The method of claim 2, further comprises:

(f) performing a Kalman Time Update, based on the current estimates of the $alpha_{1 \ldots m}$ and $beta_{0, 1 \ldots m}$ parameters, to produce
a priori state vector estimates of the time, fractional frequency, and fractional frequency rate, and
a corresponding covariance matrix of estimation errors.

4. The method of claim 3, further comprises:

(g) performing an Adaptive Time Update of the partial derivative matrices that accounts for changes over time in the $alpha_{1 \ldots m}$ and $beta_{0, 1 \ldots m}$ parameters.

5. The method of claim 1, wherein:

the fractional frequency errors are represented as first and second integrals of the product of corresponding weighting parameters $beta_{0, 1 \ldots m}$ and.$alpha_{1 \ldots m}$ with unit variance white noise random processes; and the time errors are represented as first integrals of the sum of the corresponding fractional frequency errors and the product of corresponding weighting parameters $gamma_{0, \ldots m}$ with additional unit variance white noise random processes.

6. In a system configured to generate:

a reference frequency;

multiple free-running frequencies;

a controlled frequency having a frequency responsive to a control signal; and difference measurements indicative of time and frequency-based errors associated with each free-running frequency and the controlled frequency relative to the reference frequency, a method of generating the control signal responsive to the difference measurements, comprising:

(a) using dynamic relationships associated with each free-running frequency and the controlled frequency to represent time and frequency-based errors corresponding to variances and covariances having magnitudes and rates of growth determined by random process weighting (RPW) parameters, whereby the RPW parameters are indicative of relative noise levels associated with the corresponding frequencies;

(b) the following adaptive Kalman filtering steps that, when executed in a steady-state condition, use the dynamic relationships and the difference measurements to produce their respective results:
   (i) adaptively estimating the RPW parameters associated with each free-running frequency;
   (ii) deriving, based on the RPW parameters from step (i), weighted time and frequency-based error estimates associated with each free-running frequency, wherein the weighted errors estimates are weighted to favor less noisy free-running frequencies over more noisy free-running frequencies; and
   (iii) estimating, based on the weighted error estimates from step (ii), time and frequency-based errors associated with the controlled frequency; and (c) generating the control signal based on the error estimates from step (b)(iii) such that the control signal causes the time and frequency-based errors associated with the controlled frequency to be driven toward, and maintained over time near, zero with respect to the reference frequency.

7. The method of claim 6, wherein step (b)(ii) comprises:

(I) generating, based on the RPW parameter estimates from step (b)(i), variances and covariances associated with each free-running frequency;

(II) generating, using the variances and covariances from step (I), error weights associated with each free-running frequency; and (III) estimating the weighted time and frequency-based errors associated with each free-running frequency, wherein the weighted error estimates are weighted with the corresponding error weights from step (II).

8. The method of claim 6, wherein the frequency-based errors include fractional frequency and fractional frequency rate errors.

9. In a system configured to generate a reference frequency, multiple free-running frequencies, a controlled frequency having a frequency responsive to a control signal, and difference measurements indicative of time and frequency-based errors associated with each free-running frequency and the controlled frequency relative to the reference frequency, an Adaptive Kalman Filter Processor for generating the control signal responsive to the difference measurements, comprising:

(a) dynamic relationships associated with each of the free-running frequencies and the controlled frequency to represent the time and frequency-based errors corresponding to variances and covariances having magnitudes and rates of growth determined by random process weighting (RPW) parameters, whereby the RPW parameters are indicative of relative noise levels associated with the corresponding frequencies; and (b) an adaptive Kalman Filter including the following modules that, when operated in a steady-state condition, use the dynamic relationships and the difference measurements to produce their respective results:
   (i) a first module configured to adaptively estimate the RPW parameters associated with each free-running frequency;
   (ii) a second module configured to derive, based on the RPW parameters from the first module, weighted time and frequency-based error estimates associated with each free-running frequency, wherein the weighted errors estimates are weighted to favor less noisy free-running frequencies over more noisy free-running frequencies; and
   (iii) a third module configured to estimate, based on the weighted error estimates from the second module, time and frequency-based errors associated with the controlled frequency; and (c) a state space controller configured to generate the control signal based on the error estimates from the third module such that the control signal causes the time and frequency-based errors associated with the controlled frequency to be driven toward, and maintained over time near, zero with respect to the reference frequency.

10. The Adaptive Kalman Filter Processor of claim 9, wherein the second module includes means for performing the following processing steps:

(I) generate, based on the RPW parameter estimates from the first module, variances and covariances associated with each free-running frequency;

(II) generate, using the variances and covariances from step (I), error weights associated with each free-running frequency; and (III) estimate the weighted time and frequency-based errors associated with each free-running frequency, wherein the weighted error estimates are weighted with the corresponding error weights from step (II).

* * * * *